(12) United States Patent
Saito

(10) Patent No.: US 12,524,137 B2
(45) Date of Patent: Jan. 13, 2026

(54) VEHICLE DISPLAY APPARATUS

(71) Applicant: SUBARU CORPORATION, Tokyo (JP)

(72) Inventor: Kouta Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 276 days.

(21) Appl. No.: 18/177,435

(22) Filed: Mar. 2, 2023

(65) Prior Publication Data

US 2023/0305687 A1 Sep. 28, 2023

(30) Foreign Application Priority Data

Mar. 22, 2022 (JP) ................. 2022-046129

(51) Int. Cl.
*G07C 5/00* (2006.01)
*B60H 1/00* (2006.01)
(Continued)

(52) U.S. Cl.
CPC ..... *G06F 3/04845* (2013.01); *B60H 1/00985* (2013.01); *B60K 35/10* (2024.01);
(Continued)

(58) Field of Classification Search
CPC .... G06F 3/04845; G06F 3/04847; G06F 3/16; G06F 2203/04808; B60H 1/00985;
(Continued)

(56) References Cited

U.S. PATENT DOCUMENTS 9,389,722 B2 * 7/2016 Matsuki ................ G06F 3/041
11,194,471 B1 * 12/2021 Jacome ............. G06F 3/04842
(Continued)

FOREIGN PATENT DOCUMENTS

JP 2009-075656 A 4/2009
JP 2009-205462 A 9/2009
(Continued)

OTHER PUBLICATIONS

Japanese Office Action dated Oct. 21, 2025, issued in corresponding Japan Patent Application No. JP2022-046129.

*Primary Examiner* — Kito R Robinson
*Assistant Examiner* — Anthony Gabriel Mora
(74) *Attorney, Agent, or Firm* — Rimon P.C.

(57) ABSTRACT

A vehicle display apparatus includes a display, a display processor, and an operation detector. The display processor is configured to cause the display to display a slider and a thumb. The operation detector is configured to detect touch of a finger on a display region of the display. When the operation detector continuously detects touch of the finger on a region where the slider is displayed for a first predetermined time or longer, the display processor is configured to cause the display to display an enlarged display image of the slider and the thumb. When the operation detector no longer detects touch of the finger after detecting touch of the finger for the first predetermined time or longer, the display processor is configured to cause the display to stop displaying the enlarged display image after a lapse of a second predetermined time.

4 Claims, 8 Drawing Sheets

(51) Int. Cl.
  *B60K 35/10* (2024.01)
  *B60K 35/22* (2024.01)
  *B60K 35/29* (2024.01)
  *G06F 3/04845* (2022.01)
  *G06F 3/04847* (2022.01)
  *G06F 3/16* (2006.01)
  *G07C 5/02* (2006.01)
  *G07C 5/04* (2006.01)
  *G07C 5/08* (2006.01)
  *B60K 35/81* (2024.01)

(52) U.S. Cl.
  CPC .............. *B60K 35/22* (2024.01); *B60K 35/29* (2024.01); *G06F 3/04847* (2013.01); *G06F 3/16* (2013.01); *B60K 35/81* (2024.01); *B60K 2360/195* (2024.01); *G06F 2203/04808* (2013.01)

(58) Field of Classification Search
  CPC .. B60K 35/00; B60K 35/81; B60K 2360/195; B60K 35/29
  See application file for complete search history.

(56) References Cited

U.S. PATENT DOCUMENTS

| | | | | |
|---|---|---|---|---|
| 11,708,083 | B2* | 7/2023 | Yamanouchi | B60K 35/28 |
| | | | | 701/23 |
| 2003/0070437 | A1* | 4/2003 | Hafner | B60H 1/00985 |
| | | | | 236/94 |
| 2004/0189546 | A1* | 9/2004 | Sumiyoshi | B60K 35/50 |
| | | | | 345/8 |
| 2007/0109323 | A1* | 5/2007 | Nakashima | G09G 5/14 |
| | | | | 345/661 |
| 2010/0095245 | A1* | 4/2010 | Fino | B60H 1/00985 |
| | | | | 345/173 |
| 2010/0115455 | A1* | 5/2010 | Kim | G06F 3/04845 |
| | | | | 345/173 |
| 2010/0173678 | A1* | 7/2010 | Kim | H04N 23/61 |
| | | | | 348/E5.022 |
| 2011/0157006 | A1* | 6/2011 | Miyazawa | G06F 3/0488 |
| | | | | 345/156 |
| 2013/0038556 | A1* | 2/2013 | Nakai | G06F 3/044 |
| | | | | 345/173 |
| 2014/0111540 | A1* | 4/2014 | Morimoto | G06T 11/20 |
| | | | | 345/619 |
| 2014/0300569 | A1* | 10/2014 | Matsuki | G09G 3/20 |
| | | | | 345/173 |
| 2015/0062641 | A1 | 3/2015 | Togawa | |
| 2016/0347151 | A1* | 12/2016 | Arakawa | G06F 3/04886 |
| 2017/0046040 | A1* | 2/2017 | Wang | G06F 3/04845 |
| 2020/0167116 | A1* | 5/2020 | Manabe | B60K 35/656 |
| 2020/0174642 | A1* | 6/2020 | Perrey | G01S 7/52073 |
| 2020/0393952 | A1* | 12/2020 | Hsiao | G06F 3/0482 |
| 2021/0155079 | A1* | 5/2021 | Ono | B60K 35/81 |
| 2021/0181910 | A1 | 6/2021 | Brockmole | |
| 2023/0174091 | A1* | 6/2023 | Andreetto | B60K 35/23 |
| | | | | 701/93 |
| 2024/0370154 | A1* | 11/2024 | Sasanuma | G06F 3/04847 |

FOREIGN PATENT DOCUMENTS

| | | |
|---|---|---|
| JP | 2010-036620 A | 2/2010 |
| JP | 2015-049768 A | 3/2015 |
| JP | 2015-182603 A | 10/2015 |
| JP | 2016-076038 A | 5/2016 |
| JP | 2019-166926 A | 10/2019 |

* cited by examiner

VEHICLE DISPLAY APPARATUS

CROSS-REFERENCE TO RELATED APPLICATIONS

The present application claims priority from Japanese patent application No. 2022-046129 filed on Mar. 22, 2022, the entire contents of which are hereby incorporated by reference.

BACKGROUND

The disclosure relates to a vehicle display apparatus.

In a typical vehicle such as an automobile, for example, a center cluster is provided with an apparatus including, for example, a display and an input unit. The display is adapted to displaying various types of information about an in-vehicle device such as an air conditioner or an audio device. The input unit allows an occupant of the vehicle who is to perform a setting operation on the in-vehicle device to input setting information.

This type of apparatus may be operated by a driver who drives the vehicle while the vehicle is traveling or waiting for a traffic light. In one example, when an operation region includes, for example, a touch panel, visibility is desired to ease operation complexity or reduce, for example, operation errors.

To solve issues described above, for example, Japanese Unexamined patent application Publication (JP-A) No. 2009-075656 discloses an input display apparatus. The input display apparatus displays information about an in-vehicle device such as a coupled air conditioner. The input display apparatus detects approach of a fingertip of a user to a display device, and determines which in-vehicle device is to be operated. Information about an in-vehicle device that is not determined as an in-vehicle device to be operated by the user is reduced in size for display, and an indication image for an in-vehicle device that is determined as the in-vehicle device to be operated by the user is displayed near a device state image.

SUMMARY

An aspect of the disclosure provides a vehicle display apparatus including a display, a display processor, and an operation detector. The display is configured to display an image. The display processor is configured to control a display mode of the image to be displayed on the display. The operation detector is configured to detect presence or absence of touch of a finger on at least a partial region of a display region of the display. The display processor is configured to cause the display to display a display image of a slider and a thumb with a predetermined display size. The slider indicates a settable range of an in-vehicle device, and the thumb indicates a set value within the settable range. When the operation detector continuously detects touch of the finger on a region where the slider is displayed for a first predetermined time or longer, the display processor is configured to cause the display to display an enlarged display image of the slider and the thumb. When the operation detector no longer detects touch of the finger after detecting touch of the finger on the region where the slider is displayed for the first predetermined time or longer, the display processor is configured to cause the display to stop displaying the enlarged display image of the slider and the thumb after a lapse of a second predetermined time and display the display image of the slider and the thumb with the predetermined display size.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
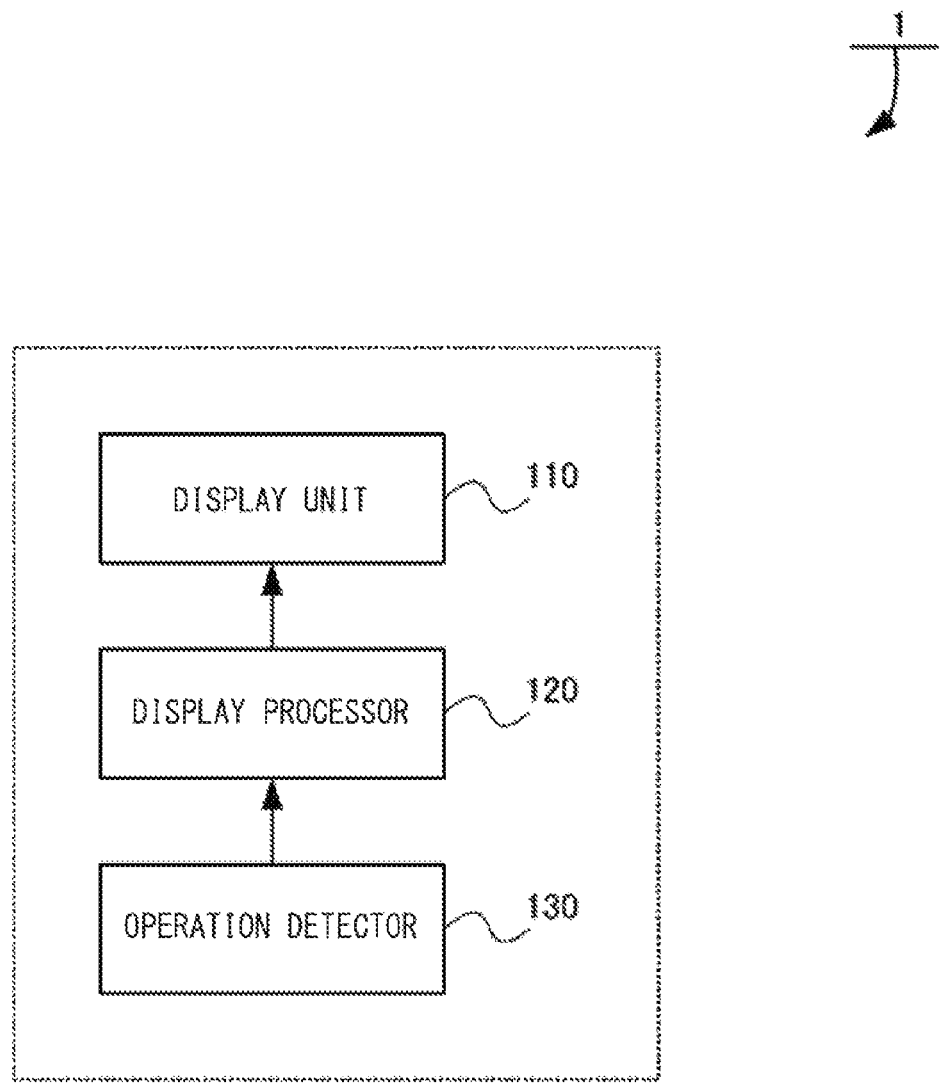
FIG. 1 is a diagram illustrating an electrical configuration of a vehicle display apparatus according to one example embodiment of the disclosure.

As with an input display apparatus disclosed in JP-A No. 2009-075656, when, for example, temperature setting on an air conditioner is changed in accordance with the number of touches on an up key or a down key or touch time on the up key or the down key and a set temperature is displayed in a region away from an operation region, it is conceivable to achieve high visibility by displaying information about a device to be operated with a large size and displaying information about a device not to be operated with a small size.

When, for example, the temperature of the air conditioner is set with a slider and a thumb, an issue arises that the slider and thumb displayed with normal display sizes are partially hidden by a hand or a finger of an occupant who performs an operation, thereby impairing visibility.

It is desirable to provide a vehicle display apparatus that makes it possible to improve visibility of a user when a setting operation is performed with a slider and a thumb provided on a display screen.

In the following, some example embodiments of the disclosure are described in detail with reference to FIGS. 1 to 8. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

Description is given of a vehicle display apparatus 1 according to a first example embodiment with reference to FIGS. 1 to 4.

Configuration of Vehicle Display Apparatus 1

As illustrated in FIG. 1, the vehicle display apparatus 1 according to the example embodiment includes a display 110, a display processor 120, and an operation detector 130.

The display 110 may include, for example, a liquid crystal display (LCD), and displays, for example, image information based on control by the display processor 120 to be described later.

In the example embodiment, for example, a slider and a thumb may be displayed with different display sizes based on control by the display processor 120. The slider may indicate a temperature settable range of an air conditioner, and the thumb may indicate a set value within the temperature settable range.

The display processor 120 controls a display mode of, for example, image information to be displayed on the display 110.

In one example, the display processor 120 causes the display 110 to display, for example, a display image of the slider and the thumb with a predetermined display size. The slider may indicate the temperature settable range of the air conditioner, and the thumb may indicate a set value within the temperature settable range. When the operation detector 130 to be described later continuously detects contact (touch) of a finger on a region where the slider is displayed for a first predetermined time or longer, the display processor 120 causes the display 110 to display an enlarged display image of the slider and the thumb. When the operation detector 130 no longer detects touch of the finger after detecting touch of the finger on the region where the slider is displayed, the display processor 120 causes the display 110 to stop displaying the enlarged display image of the slider and the thumb after a lapse of a second predetermined time and display the display image of the slider and the thumb with the predetermined display size.

A more specific display mode is described below with reference to FIGS. 2 and 3 that illustrate a display mode of an image on the display 110.

Figure 2:
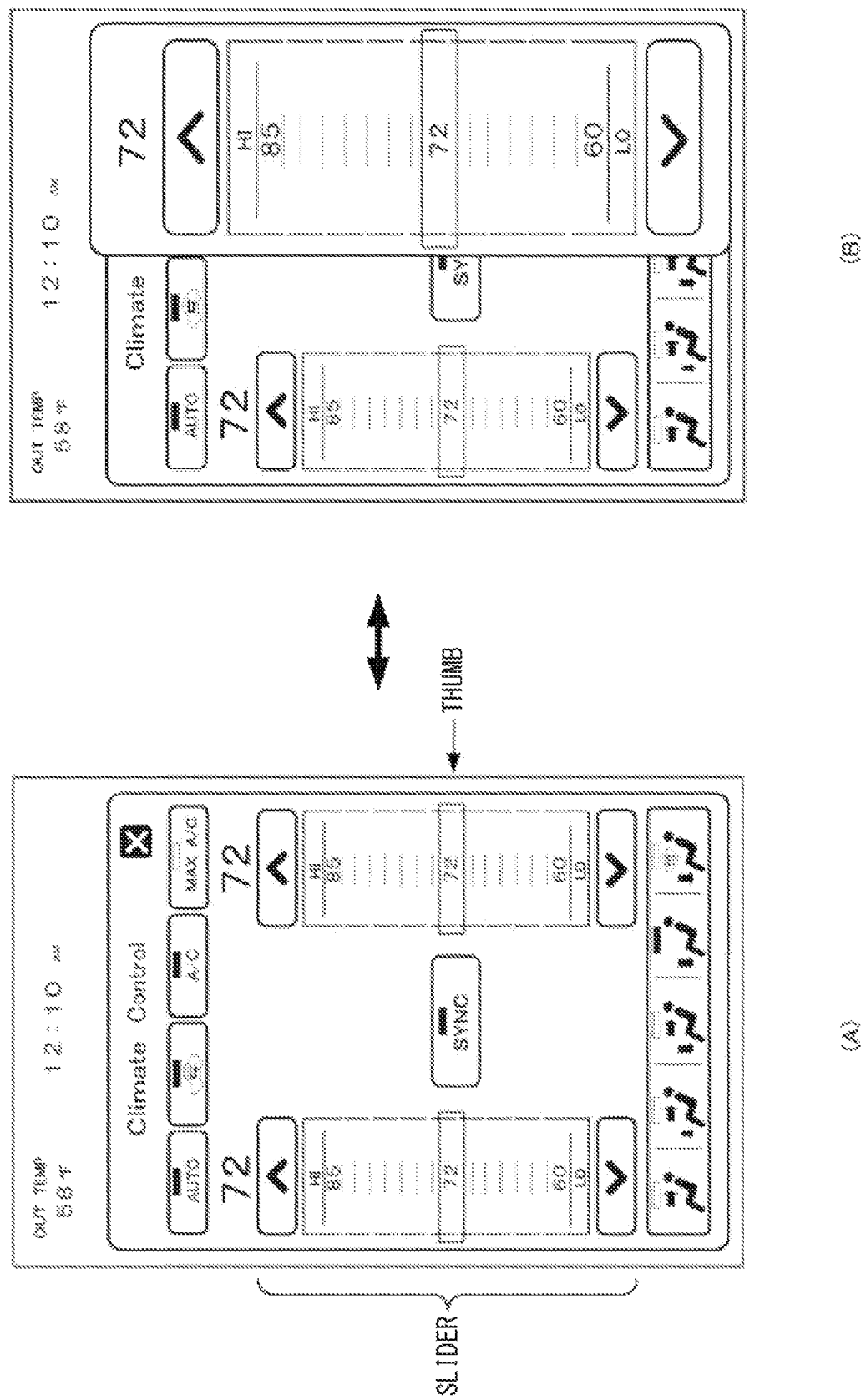
FIG. 2 is a diagram illustrating an exemplary display mode of a vehicle display apparatus according to one example embodiment of the disclosure.

(A) of FIG. 2 illustrates a display mode of the slider and the thumb in a normal state when a user (occupant) of a vehicle does not touch, with a finger of the user, a region where the slider and the thumb are displayed. The slider may indicate the temperature settable range of the air conditioner, and the thumb may indicate a set value within the temperature settable range.

When, for example, the occupant sitting in the driver's seat of the vehicle continuously touches, with a finger of the occupant, a region where a slider is displayed on the right side in (A) of FIG. 2 for the first predetermined time or longer from a state illustrated in (A) of FIG. 2, the slider and a thumb on the right side in (A) of FIG. 2 may be enlarged for display without changing display positions in a horizontal direction of the slider and the thumb, as illustrated in (B) of FIG. 2.

When the finger of the occupant sitting in the driver's seat of the vehicle is released from the region where the slider is displayed, on the right side in (B) of FIG. 2, display of an enlarged display image may end after a lapse of the second predetermined time.

Figure 3:
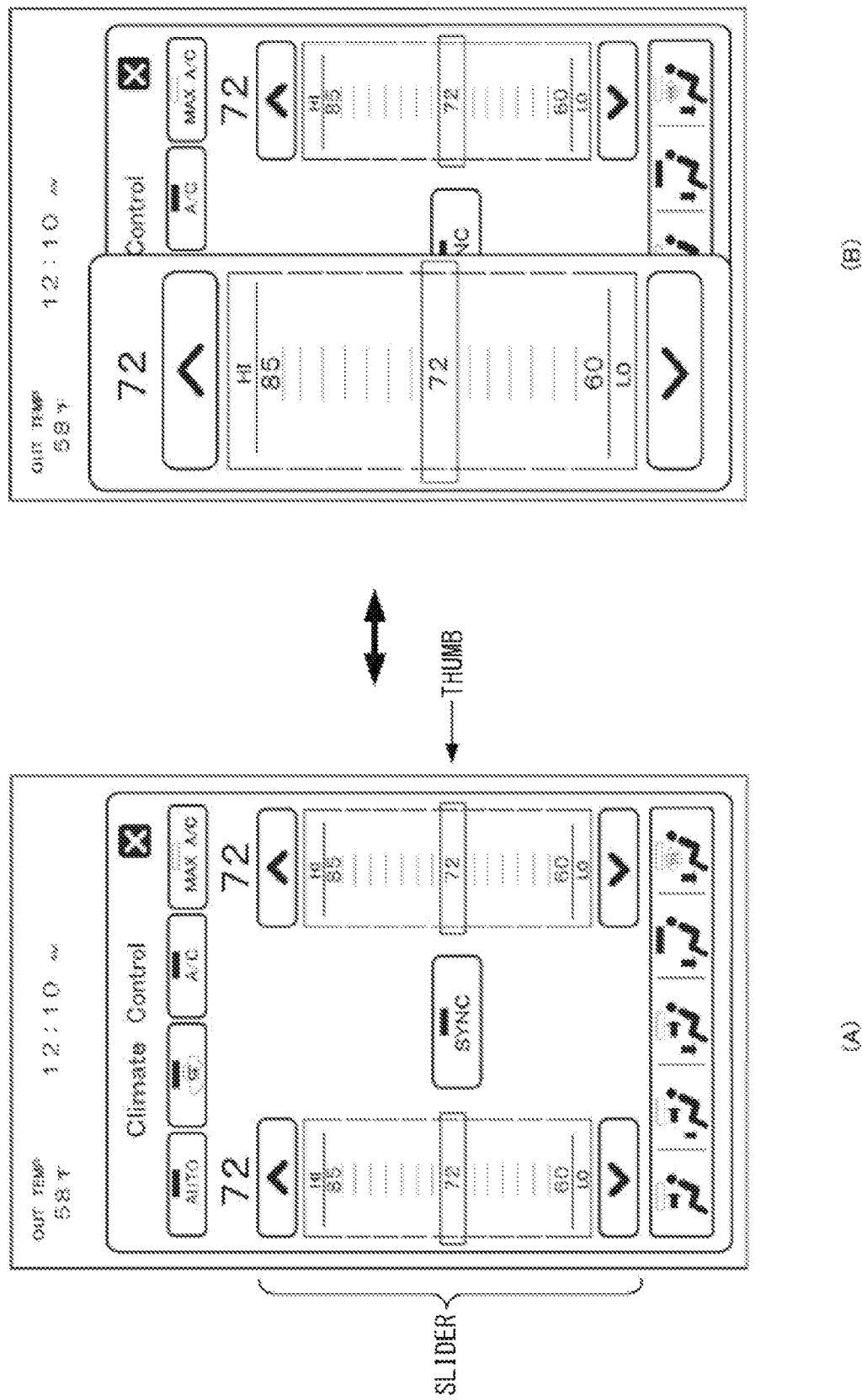
FIG. 3 is a diagram illustrating an exemplary display mode of the vehicle display apparatus according to one example embodiment of the disclosure.

When an occupant sitting in the passenger seat of the vehicle continuously touches, with a finger of the occupant, a region where a slider is displayed on the left side in (A) of FIG. 3 for the first predetermined time or longer, the slider and a thumb on the left side of (A) of FIG. 3 may be enlarged for display without changing display positions in the horizontal direction of the slider and the thumb, as illustrated in (B) of FIG. 3.

When the finger of the occupant sitting in the passenger seat of the vehicle is released from the region where the slider is displayed on the left side in (B) of FIG. 3, display of an enlarged display image may end after a lapse of the second predetermined time.

Note that the "first predetermined time" and the "second predetermined time" refer to predetermined times. In one example, in consideration of operability for the occupant, the "first predetermined time" may be a short time to avoid false touch of a finger of the occupant, and the "second predetermined time" may be a time it takes to confirm setting operation details.

The display image may be enlarged at a predetermined magnification. The "second predetermined time" and the "magnification of the display image" may be optionally settable by the occupant in advance.

The operation detector 130 may include, for example, a touch panel stacked on the LCD of the display 110, and detects touch or non-touch of a finger of the occupant on at least a partial region of a display region of the display 110.

Note that information detected by the operation detector 130 may be outputted to the display processor 120.

Process in Vehicle Display Apparatus 1

Figure 4:
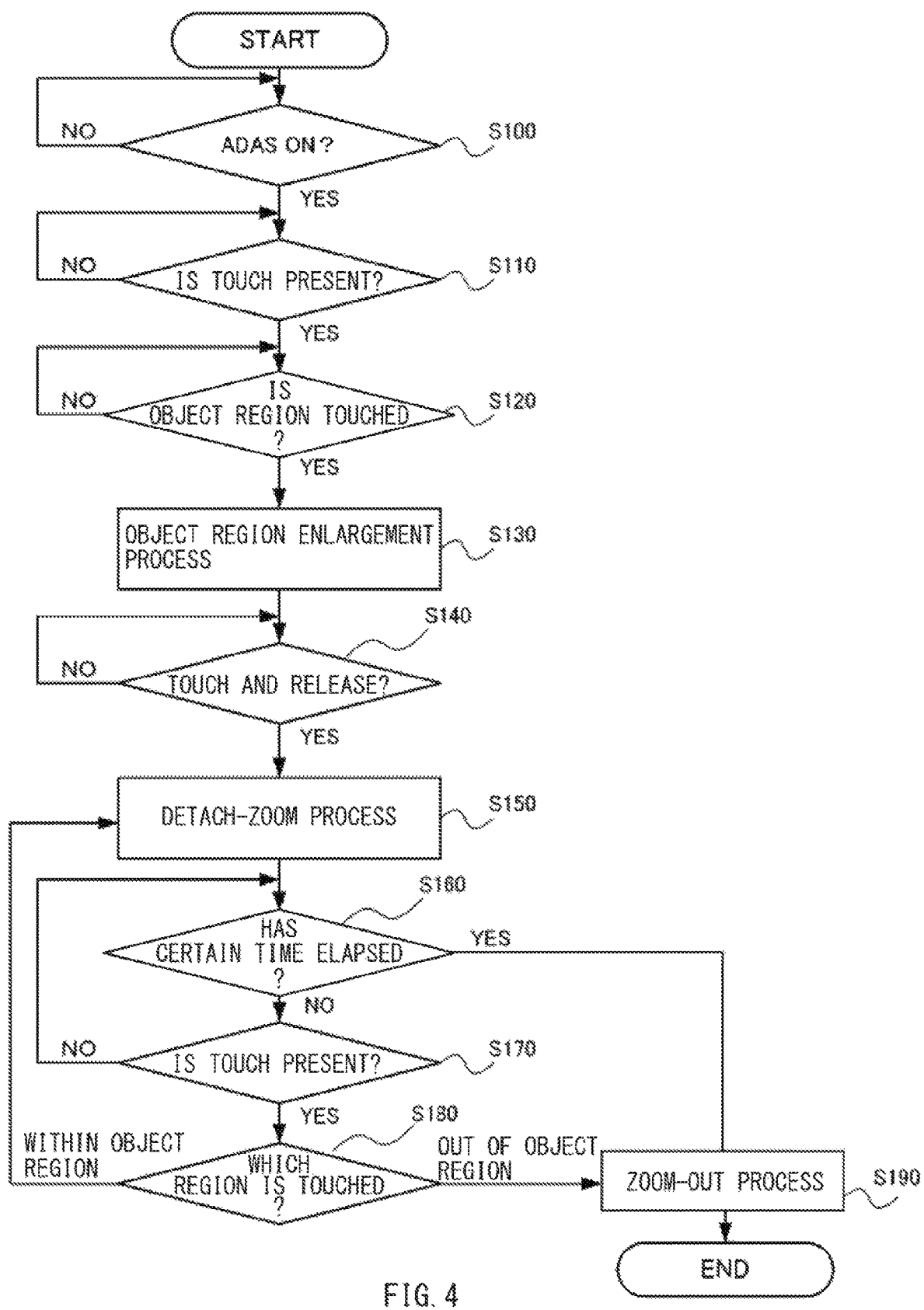
FIG. 4 is a flowchart illustrating a process to be executed by the vehicle display apparatus according to one example embodiment of the disclosure.

Description is given of a process to be executed by the vehicle display apparatus 1 according to the example embodiment with reference to FIG. 4.

A vehicle to which the vehicle display apparatus 1 is applicable may include an electronic control unit (ECU) as a processor configured to control, for example, various electronic devices provided in the vehicle.

As illustrated in FIG. 4, the processor may determine whether a control mode of the vehicle is an advanced driver-assistance systems (ADAS) mode (step S100).

When the processor has determined that the control mode of the vehicle is not the ADAS mode (S100: NO), the processor may cause the process to return to step S100 and be put on standby.

When the processor determines that the control mode of the vehicle is the ADAS mode (S100: YES), the processor may transmit information that the control mode of the vehicle is the ADAS mode to the display processor 120.

When the display processor 120 receives the information that the control mode of the vehicle is the ADAS mode from the processor, the display processor 120 may determine whether a finger of the occupant of the vehicle touches the display 110, based on information from the operation detector 130 (step S110).

When the display processor 120 has determined that the finger of the occupant of the vehicle does not touch the display 110, based on the information from the operation detector 130 (S110: NO), the display processor 120 may cause the process to return to step S110 and be put on standby.

When the display processor 120 determines that the finger of the occupant of the vehicle touches the display 110, based on the information from the operation detector 130 (S110: YES), the display processor 120 may determine whether a point touched by the finger of the occupant of the vehicle is within an object region (step S120).

When the display processor 120 has determined that the touched point is not within the object region (S120: NO), the display processor 120 may cause the process to return to step S120 and be put on standby.

When the display processor 120 determines that the touched point is within the object region (S120: YES), the display processor 120 may execute an object region enlargement process (step S130). In the object region enlargement process, the object region including the touched point may be enlarged for display.

The display processor 120 may determine whether the finger of the occupant of the vehicle is changed from a state of touching the object region of the display 110 to a state of not touching the object region of the display 110, based on the information from the operation detector 130 (step S140). This change in state may also be referred to as touch and release.

When the display processor 120 has determined that the finger of the occupant of the vehicle is not changed from the state of touching the object region of the display 110 to the state of not touching the object region of the display 110, based on the information from the operation detector 130 (S140: NO), the display processor 120 may cause the process to return to step S140 and be put on standby.

When the display processor 120 determines that the finger of the occupant of the vehicle is changed from the state of touching the object region of the display 110 to the state of not touching the object region of the display 110, based on the information from the operation detector 130 (S140: YES), the display processor 120 may cause the process to proceed to a detach-zoom process (step S150). In the detach-zoom process, the object region may be enlarged for display until the second predetermined time elapses from when changing to the state of not touching the object region of the display 110.

The display processor 120 may determine whether the second predetermined time (a certain time) has elapsed from when changing to the state of not touching the object region of the display 110 (step S160).

When the display processor 120 determines that the second predetermined time has elapsed from when changing to the state of not touching the object region of the display 110 (S160: YES), the display processor 120 may cause the process to proceed to a zoom-out process (step S190), and all control processes may end after the zoom-out process. In the zoom-out process, the object region enlarged for display may be restored to its original size.

When the display processor 120 determines that the certain time has not elapsed from when changing to the state of not touching the object region of the display 110 (S160: NO), the display processor 120 may determine whether the finger of the occupant of the vehicle touches the display 110, based on the information from the operation detector 130 (step S170).

When the display processor 120 determines that the finger of the occupant of the vehicle does not touch the display 110, based on the information from the operation detector 130 (S170: NO), the display processor 120 may cause the process to return to step S160 and be put on standby.

When the display processor 120 determines that the finger of the occupant of the vehicle touches the display 110, based on the information from the operation detector 130 (S170: YES), the display processor 120 may determine which region a point touched by the finger of the occupant of the vehicle is within (step S180).

When the display processor 120 determines that the touched point is out of the object region, the display processor 120 may cause the process to proceed to the zoom-out process (step S190), and all control processes may end after the zoom-out process. In the zoom-out process, the object region enlarged for display may be restored to its original size.

When the display processor 120 determines that the touched point is within the object region, the display processor 120 may cause the process to proceed to the detach-zoom process (step S150).

Workings and Effects

As described above, the display processor 120 of the vehicle display apparatus 1 according to the example embodiment causes the display 110 to display the display image of the slider and the thumb with the predetermined display size. The slider indicates the temperature settable range of the air conditioner, and the thumb indicates a set value within the temperature settable range. When the operation detector 130 continuously detects touch of a finger on the region where the slider is displayed for the first predetermined time or longer, the display processor 120 causes the display 110 to display an enlarged display image of the slider and the thumb. When the operation detector 130 no longer detects touch of the finger after detecting touch of the finger on the region where the slider is displayed for the first predetermined time or longer, the display processor 120 causes the display 110 to stop displaying the enlarged display image of the slider and the thumb after a lapse of the second predetermined time and display the display image of the slider and the thumb with the predetermined display size.

For example, when the slider indicating the temperature settable range and the thumb indicating a set value within the temperature settable range are displayed on the display 110 used for temperature setting on the air conditioner, the display processor 120 causes the display 110 to display the slider and the thumb with predetermined display sizes in a normal state. When the operation detector 130 continuously detects touch of a finger on the region where the slider is displayed for the first predetermined time or longer, the display processor 120 causes the display 110 to display an enlarged display image of the slider and the thumb.

Accordingly, when the operation detector 130 continuously detects touch of a finger on the region where the slider is displayed for the first predetermined time or longer, the enlarged display image of the slider and the thumb is displayed on the display 110, which makes it possible to improve visibility of the user and enhance operability for the user even in a case of operation display with the slider and the thumb. Operation display with the slider and the thumb can impair visibility with respect to displayed information to be confirmed, as compared with another display mode such as an up-down key, because in an operation with a finger of a user (occupant), the finger overlaps the displayed information.

Considering that the operation is to be executed in a vehicle, the first predetermined time may be set to a short time to avoid false touch of a finger of the user, which makes it possible to further improve visibility of the user and enhance operability for the user.

When the operation detector 130 no longer detects touch of the finger after detecting touch of the finger on the region where the slider is displayed for the first predetermined time or longer, the display processor 120 causes the display 110 to stop displaying the enlarged display image of the slider and the thumb after a lapse of the second predetermined time and display the display image of the slider and the thumb with the predetermined display size.

In other words, even when the user ends a setting operation and releases the finger of the user from an operation object region, enlarged display may continue for a certain time.

This makes it possible for the user to confirm details set by the user with high visibility in a state in which the finger of the user that may impair visibility is released from the operation object region.

Modification Example 1

In the first example embodiment, temperature setting on side of the driver's seat or temperature setting on side of the passenger seat has been described as one example; however, similar display control may be executed, for example, in a case of temperature setting on a defroster, a defogger, etc., louver setting, air volume setting, and volume setting on an audio device, in addition to temperature setting for the occupant.

Even in such a case, executing similar display control makes it possible to improve visibility of the user and enhance operability.

Second Example Embodiment

Description is given of a vehicle display apparatus 1A according to a second example embodiment with reference to FIGS. 5 to 8.

Configuration of Vehicle Display Apparatus 1A

Figure 5:
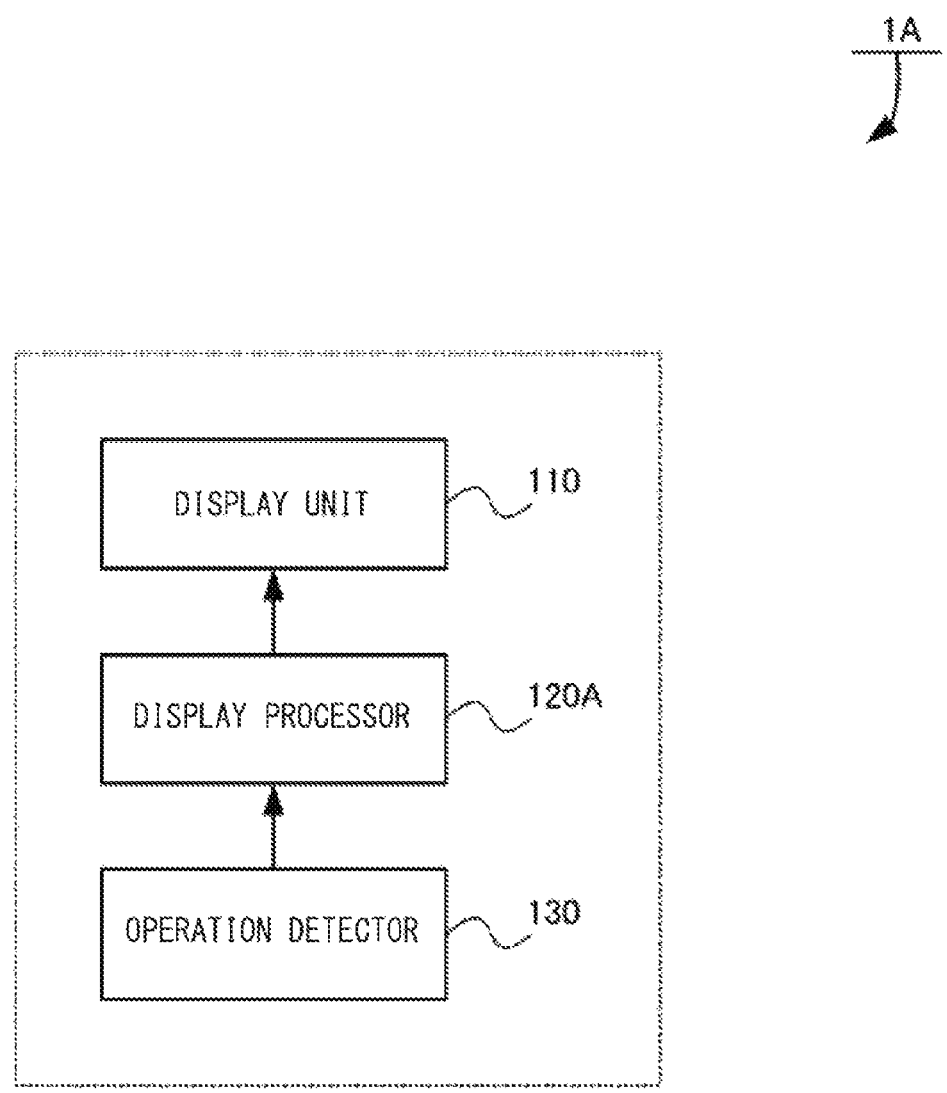
FIG. 5 is a diagram illustrating an electrical configuration of a vehicle display apparatus according to one example embodiment of the disclosure.

As illustrated in FIG. 5, the vehicle display apparatus 1A according to the example embodiment includes the display 110, a display processor 120A, and the operation detector 130.

Note that elements denoted with the same reference numerals as in the first example embodiment have substantially the same functions as those in the first example embodiment, and detailed descriptions thereof are therefore omitted.

The display processor 120A may control a display mode of image information to be displayed on the display 110.

In one example, the display processor 120A may cause, for example, a display image of a first thumb and a first slider and a display image of a second thumb and a second slider to be displayed on the display 110. The first thumb may be used to perform temperature setting on a first air conditioner, and the first slider may indicate a temperature settable range of the first air conditioner. The first air conditioner may be, for example, a driver's seat air conditioner. The second thumb may be used to perform temperature setting on a second air conditioner, and the second slider may indicate a temperature settable range of the second air conditioner. The second air conditioner may be, for example, a passenger seat air conditioner. When the operation detector 130 continuously detects touch of a finger on a region where the first thumb or the first slider is displayed for the first predetermined time or longer, the display processor 120A may cause the display 110 to display an enlarged display image of the first thumb and the first slider. When the operation detector 130 continuously detects touch of a finger on a region where the second thumb or the second slider is displayed for the first predetermined time or longer while the enlarged display image of the first thumb and the first slider is displayed on the display 110, the display processor 120A may cause the display 110 to display an enlarged display image of the second thumb and the second slider while displaying the enlarged display image of the first thumb and the first slider.

When the display processor 120A causes the display 110 to display the enlarged display image of the first thumb and the first slider and the enlarged display image of the second thumb and the second slider, the display processor 120A may cause the display 110 to display the enlarged display images without overlapping each other.

A more specific display mode is described below with reference to FIG. 6 that illustrates a display mode of an image on the display 110.

Figure 6:
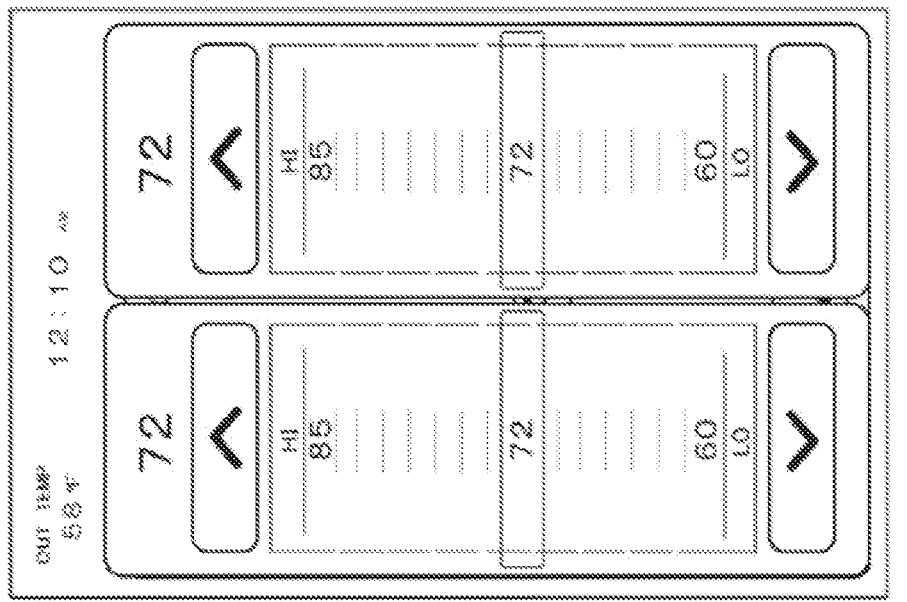
FIG. 6 is a diagram illustrating an exemplary display mode of the vehicle display apparatus according to one example embodiment of the disclosure.
Figure 6:
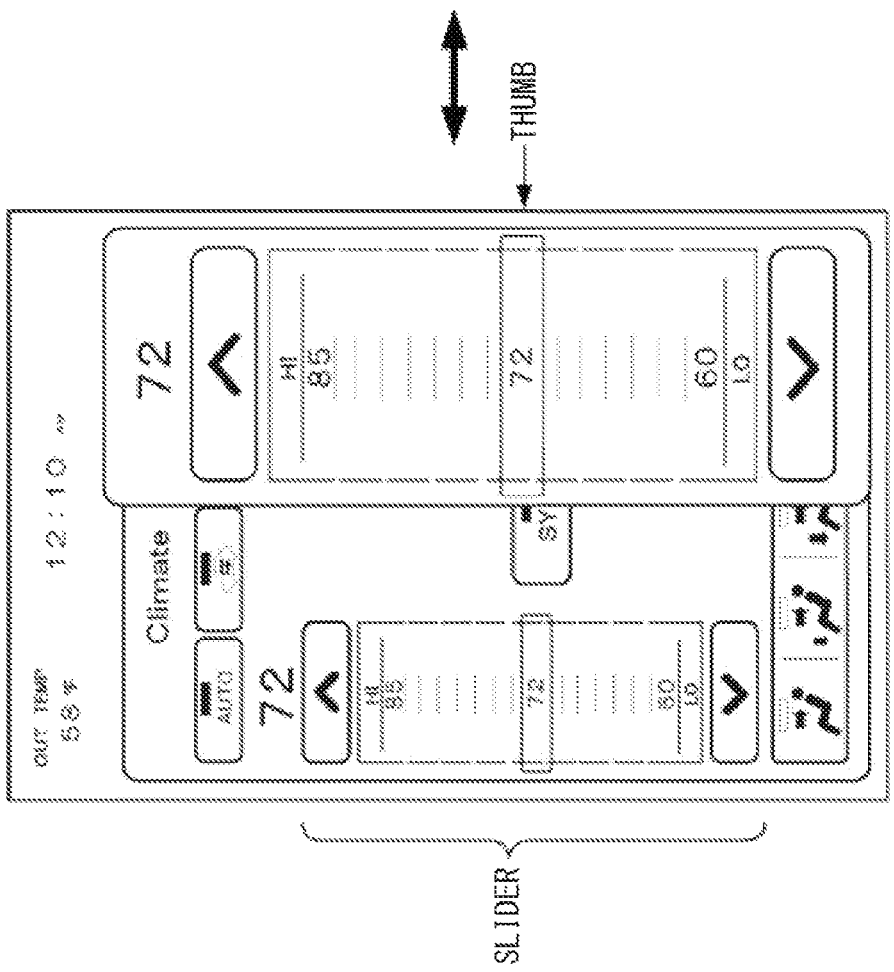

(A) of FIG. 6 illustrates a display mode when a user (occupant) sitting in the driver's seat of a vehicle continuously touches, with a finger of the user sitting in the driver's seat of the vehicle, a region where the first thumb and the first slider are displayed for the first predetermined time or longer. The first thumb may be used to perform temperature setting on the first air conditioner (driver's seat air conditioner), and the first slider may indicate the temperature settable range of the first air conditioner.

When, for example, an occupant sitting in the passenger seat of the vehicle continuously touches, with a finger of the occupant sitting in the passenger seat of the vehicle, a region where a slider is displayed on the left side in (A) of FIG. 6 for the first predetermined time or longer from a state illustrated in (A) of FIG. 6, a region where the slider and a thumb are displayed on the left side in (A) of FIG. 6 may be enlarged for display without changing a display position in the horizontal direction of the slider on the left side in (A) of FIG. 6, as illustrated in (B) of FIG. 6. When the finger of the occupant sitting in the driver's seat or the passenger seat of the vehicle is released from the region where the slider is displayed on the right side or the left side in (B) of FIG. 6, display of an enlarged display image may end after a lapse of the second predetermined time.

Note that in a case illustrated in (B) of FIG. 6, an enlarged display image of the slider on the left and an enlarged display image of the slider on the right do not overlap each other.

Process in Vehicle Display Apparatus 1A

Figure 7:
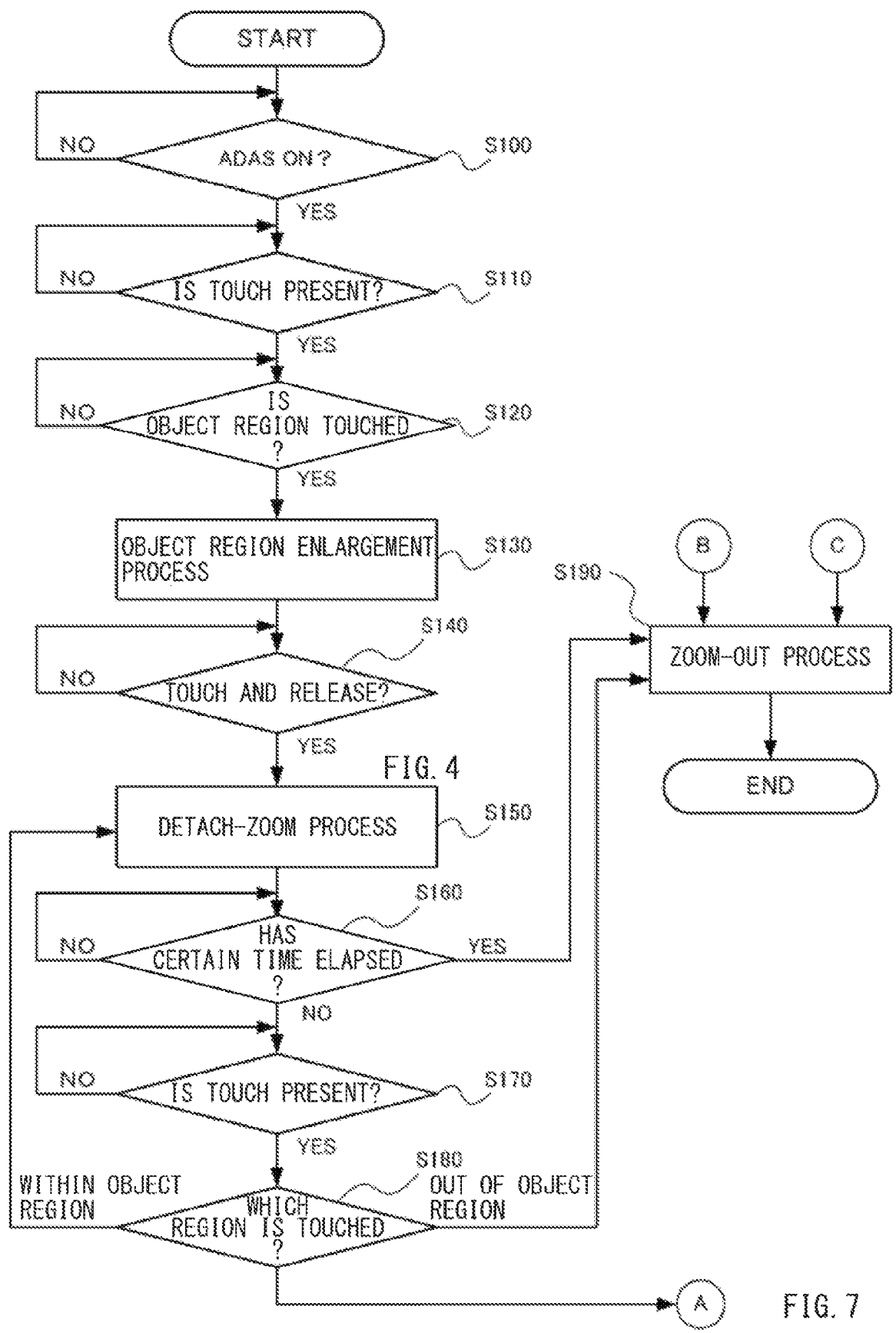
FIG. 7 is a flowchart illustrating a process to be executed by the vehicle display apparatus according to one example embodiment of the disclosure.
Figure 8:
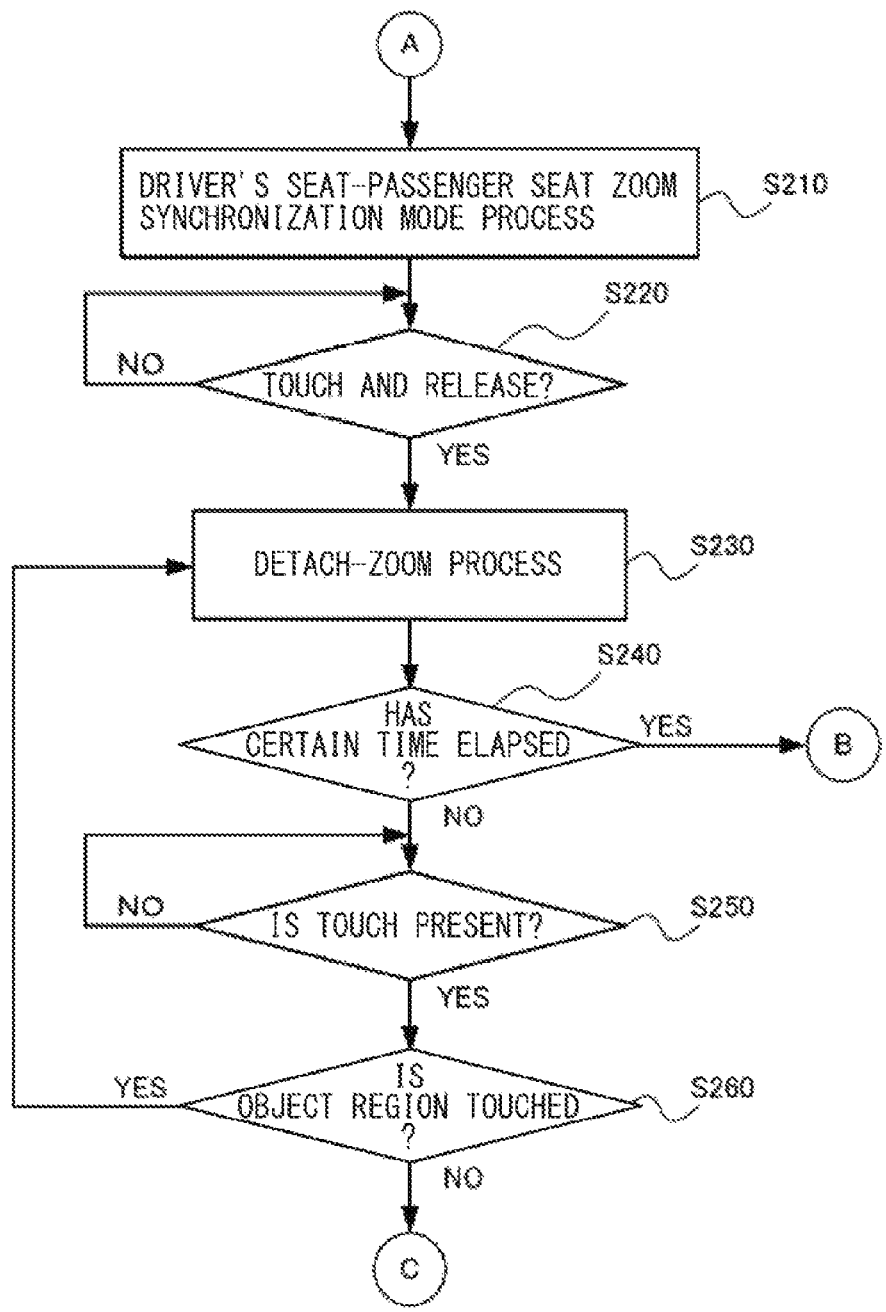
FIG. 8 is a flowchart illustrating a process to be executed by the vehicle display apparatus according to one example embodiment of the disclosure.

Description is given of a process to be executed by the vehicle display apparatus 1A according to the example embodiment with reference to FIGS. 7 and 8.

A vehicle to which the vehicle display apparatus 1A is applicable may include an ECU as a processor configured to control, for example, various electronic devices provided in the vehicle.

As illustrated in FIG. 7, the processor may determine whether the control mode of the vehicle is the ADAS mode (step S100).

When the processor has determined that the control mode of the vehicle is not the ADAS mode (S100: NO), the processor may cause the process to return to step S100 and be put on standby.

When the processor determines that the control mode of the vehicle is the ADAS mode (S100: YES), the processor may transmit information that the control mode of the vehicle is the ADAS mode to the display processor 120.

When the display processor 120A receives the information that the control mode of the vehicle is the ADAS mode from the processor, the display processor 120A may determine whether a finger of the occupant of the vehicle touches the display 110, based on information from the operation detector 130 (step S110).

When the display processor 120A has determined that the finger of the occupant of the vehicle does not touch the display 110, based on the information from the operation detector 130 (S110: NO), the display processor 120A may cause the process to return to step S110 and be put on standby.

When the display processor 120A determines that the finger of the occupant of the vehicle touches the display 110, based on the information from the operation detector 130 (S110: YES), the display processor 120A may determine whether a point touched by the finger of the occupant of the vehicle is within an object region (step S120).

When the display processor 120A determines that the touched point is not within the object region (S120: NO), the display processor 120A may cause the process to return to S120 and be put on standby.

When the display processor 120A determines that the touched point is within the object region (S120: YES), the display processor 120A may execute the object region enlargement process (step S130). In the object region enlargement process, the object region including the touched point may be enlarged for display.

The display processor 120A may determine whether the finger of the occupant of the vehicle is changed from a state of touching the object region of the display 110 to a state of not touching the object region of the display 110, based on the information from the operation detector 130 (step S140). This change in state may also be referred to as touch and release.

When the display processor 120A has determined that the finger of the occupant of the vehicle is not changed from the state of touching the object region of the display 110 to the state of not touching the object region of the display 110, based on the information from the operation detector 130 (S140: NO), the display processor 120A may cause the process to return to step S140 and be put on standby.

When the display processor 120A determines that the finger of the occupant of the vehicle is changed from the state of touching the object region of the display 110 to the state of not touching the object region of the display 110, based on the information from the operation detector 130 (S140: YES), the display processor 120A may cause the process to proceed to the detach-zoom process (step S150). In the detach-zoom process, the object region may be enlarged for display until the second predetermined time elapses from when changing to the state of not touching the object region of the display 110.

The display processor 120A may determine whether the second predetermined time (a certain time) has elapsed from when changing to the state of not touching the object region (step S160).

When the display processor 120A determines that the second predetermined time has elapsed from when changing to the state of not touching the object region of the display 110 (S160: YES), the display processor 120A may cause the process to proceed to the zoom-out process (step S190), and all control processes may end after the zoom-out process. In the zoom-out process, the object region enlarged for display may be restored to its original size.

When the display processor 120A determines that the certain time has not elapsed from when changing to the state of not touching the object region of the display 110 (S160: NO), the display processor 120A may determine whether the finger of the occupant of the vehicle touches the display 110, based on the information from the operation detector 130 (step S170).

When the display processor 120A determines that the finger of the occupant of the vehicle does not touch the display 110, based on the information from the operation detector 130 (S170: NO), the display processor 120A may cause the process to return to step S160 and be put on standby.

When the display processor 120A determines that the finger of the occupant of the vehicle touches the display 110, based on the information from the operation detector 130 (S170: YES), the display processor 120A may determine which region a point touched by the finger of the occupant of the vehicle is within (step S180).

When the display processor 120A determines that the touched point is out of the object region, the display processor 120A may cause the process to proceed to the zoom-out process (step S190), and all control processes may end after the zoom-out process. In the zoom-out process, the object region enlarged for display may be restored to its original size.

When the display processor 120A determines that the touched point is within the object region, the display processor 120A may cause the process to proceed to the detach-zoom process (step S150).

Furthermore, as illustrated in FIG. 8, when the display processor 120A determines that the point touched by the finger of the occupant of the vehicle is neither within nor out of the object region in step S180, the display processor 120A may determine that a finger of the occupant sitting in the driver's seat of the vehicle and a finger of the occupant sitting in the passenger seat of the vehicle touch respective object regions, and may execute a driver's seat-passenger seat zoom synchronization mode process (step S210). In the driver's seat-passenger seat zoom synchronization mode process, both the object region touched by the finger of the occupant sitting in the driver's seat of the vehicle and the object region touched by the finger of the occupant sitting in the passenger seat of the vehicle are enlarged for display.

The display processor 120A may determine whether the finger of the occupant sitting in the driver's seat or the passenger seat of the vehicle is changed from a state of touching the display 110 to a state of not touching the display 110, based on the information from the operation detector 130 (step S220).

When the display processor 120A determines that the finger of the occupant sitting in the driver's seat or the passenger seat of the vehicle is not changed from the state of touching the display 110 to the state of not touching the display 110, based on the information from the operation detector 130 (S220: NO), the display processor 120A may cause the process to return to S220 and be put on standby.

When the display processor 120A determines that the finger of the occupant sitting in the driver's seat or the passenger seat of the vehicle is changed from the state of touching the display 110 to the state of not touching the display 110, based on the information from the operation detector 130 (S220: YES), the display processor 120A may cause the process to proceed to the detach-zoom process (step S230). In the detach-zoom process, the object region may be enlarged for display until the second predetermined time elapses from when changing to the state of not touching the object region of the display 110.

The display processor 120A may determine whether the second predetermined time has elapsed from when changing to the state of not touching the object region by the finger of the occupant sitting in the driver's seat or the passenger seat of the vehicle (step S240).

When the display processor 120A determines that the certain time has elapsed from when changing to the state of not touching the object region by the finger of the occupant sitting in the driver's seat or the passenger seat of the vehicle (S240: YES), the display processor 120A may cause the process to proceed to the zoom-out process (step S190), and all control processes may end after the zoom-out process. In the zoom-out process, the object region enlarged for display may be restored to its original size.

When the display processor 120A determines that the certain time has not elapsed from when changing to the state of not touching the object region by the finger of the occupant sitting in the driver's seat or the passenger seat of the vehicle (S240: NO), the display processor 120A may determine whether the finger of the occupant sitting in the driver's seat or the passenger seat of the vehicle touches the display 110, based on the information from the operation detector 130 (step S250).

When the display processor 120A has determined that the finger of the occupant sitting in the driver's seat or the passenger seat of the vehicle does not touch the display 110, based on the information from the operation detector 130 (S250: NO), the display processor 120A may cause the process to return to step S250 and be put on standby.

When the display processor 120A determines that the finger of the occupant sitting in the driver's seat or the passenger seat of the vehicle touches the display 110, based on the information from the operation detector 130 (S250: YES), the display processor 120A may determine which region a point touched by the finger of the occupant sitting in the driver's seat or the passenger seat of the vehicle is within (step S260).

When the display processor 120A determines that the touched point is out of the object region, the display processor 120A may cause the process to proceed to the zoom-out process (step S190), and all control processes may end after the zoom-out process. In the zoom-out process, the object region enlarged for display may be restored to its original size.

When the display processor 120A determines that the touched point is within the object region, the display processor 120A may cause the process to proceed to the detach-zoom process (step S230).

Workings and Effects

As described above, the display processor 120A of the vehicle display apparatus 1A according to the example embodiment may cause the display image of the first thumb and the first slider and the display image of the second thumb and the second slider to be displayed. The first thumb may be used to perform temperature setting on the first air conditioner (driver's seat air conditioner), and the first slider may indicate the temperature settable range of the first air conditioner. The second thumb may be used to perform temperature setting on the second air conditioner (passenger seat air conditioner), and the second slider may indicate the temperature settable range of the second air conditioner. When the operation detector 130 continuously detects touch of a finger on the region where the first thumb or the first slider is displayed for the first predetermined time or longer, the display processor 120A may cause the display 110 to display an enlarged display image of the first thumb and the first slider. When the operation detector 130 continuously detects touch of a finger on the region where the second thumb or the second slider is displayed for the first predetermined time or longer while the enlarged display image of the first thumb and the first slider is displayed on the display 110, the display processor 120A may cause the display 110 to display the enlarged display image of the second thumb and the second slider while displaying the enlarged display image of the first thumb and the first slider.

For example, when the sliders indicating the temperature settable range and the thumbs indicating a set value within the temperature settable range are displayed on the display 110 to be used for temperature setting on the air conditioner, the display processor 120A may cause the display 110 to display the display image of the first slider and the first thumb and the display image of the second thumb and the second slider with predetermined display sizes in a normal state. The first thumb may be used to perform temperature setting on the first air conditioner (driver's seat air conditioner), and the first slider may indicate the temperature settable range of the first air conditioner. The second thumb may be used to perform temperature setting on the second air conditioner (passenger seat air conditioner), and the second slider may indicate the temperature settable range of the second air conditioner. When the operation detector 130 continuously detects touch of a finger on the region where the first thumb or the first slider is displayed for the first predetermined time or longer, the display processor 120A may cause the display 110 to display an enlarged display image of the first thumb and the first slider.

Accordingly, when the operation detector 130 continuously detects touch of a finger of the occupant sitting in the driver's seat of the vehicle on the region where the first slider is displayed for the first predetermined time or longer, the enlarged display image of the first slider and the first thumb may be displayed on the display 110, which makes it possible to improve visibility of the user and enhance operability for the user even in a case of operation display with the slider and the thumb. Operation display with the slider and the thumb can impair visibility with respect to displayed information to be confirmed, as compared with another display mode such as an up-down key, because in an operation with a finger of the occupant sitting in the driver's seat of the vehicle, the finger overlaps the displayed information.

Further, when the operation detector 130 continuously detects touch of a finger of the occupant sitting in the passenger seat of the vehicle on the region where the second thumb or the second slider is displayed for the first predetermined time or longer while the enlarged display image of the first thumb and the first slider is displayed on the display 110, the display processor 120A may cause the display 110 to display the enlarged display image of the second thumb and the second slider while displaying the enlarged display image of the first thumb and the first slider.

Accordingly, when the finger of the occupant sitting in the passenger seat of the vehicle continuously touches the region where the second thumb or the second slider is displayed for the first predetermined time or longer while the enlarged display image of the first thumb and the first slider is displayed on the display 110, the first thumb and the first slider may be enlarged for display and the second thumb and the second slider may be enlarged for display, which further improve visibility of the occupant sitting in the passenger seat of the vehicle in addition to visibility of the occupant sitting in the driver's seat of the vehicle. This makes it possible to further enhance operability for the occupants siting in the driver's seat and the passenger seat of the vehicle.

Further, when the display processor 120A of the vehicle display apparatus 1A according to the example embodiment causes the display 110 to display the enlarged display image of the first thumb and the first slider and the enlarged display image of the second thumb and the second slider, the display processor 120A may cause the display 110 to display the enlarged display images without overlapping each other.

Accordingly, for example, an object region to be operated by the occupant sitting in the driver's seat of the vehicle may not overlap an object region to be operated by the occupant sitting in the passenger seat of the vehicle, thereby not causing another impairment in visibility. Thus, in addition to visibility of the occupant sitting in the driver's seat of the vehicle, visibility of the occupant sitting in the passenger seat of the vehicle is also further improved, which makes it possible to further enhance operability for the occupants sitting in the driver's seat and the passenger seat of the vehicle.

Modification Example 2

In the second example embodiment, one example in which a normal display image of the thumb and the slider is enlarged for display has been described. In another example, temperature setting information in a vehicle traveling in a peripheral region may be obtained by a connected system, and a local part with a focus on an average value of setting temperatures may be enlarged for display.

A region of the setting temperature may be narrowed by such a display mode.

This makes it possible to reduce impairment in visibility with respect to displayed information to be confirmed by a finger of the occupant sitting in the driver's seat or the passenger seat of the vehicle, and enhance operability.

The vehicle display apparatuses 1 and 1A of the example embodiments of the disclosure may be implemented by recording the processes to be executed by the display processors 120 and 120A in a recording medium readable by a computer system, and by causing the display processors 120 and 120A to read and execute a program held in the recording medium. A computer system as used herein includes an operating system and hardware such as peripheral devices.

In the case with the use of the World Wide Web (WWW) system, the "computer system" also includes an environment that provides and/or displays a website. The program may be transmitted from the computer system in which the program is held in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the process described above. In addition, the program may be a so-called differential file, or a differential program, that is able to realize the process described above by a combination with a program already held in the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. For example, in the example embodiments described above, the air conditioner has been described as an example of the in-vehicle device, and display control upon performing temperature setting on the air conditioner has been described. However, the disclosure is not limited thereto. The display control may include a setting operation on an in-vehicle device, such as volume setting on an audio device, by performing a touch operation on a display intended to be used in a vehicle compartment of a vehicle.

Each of the display processor 120 illustrated in FIG. 1 and the display processor 120A illustrated in FIG. 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the display processor 120 illustrated in FIG. 1 and the display processor 120A illustrated in FIG. 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the display processor 120 illustrated in FIG. 1 and the display processor 120A illustrated in FIG. 5.

The invention claimed is:

1. A vehicle display apparatus comprising:
a display configured to display an image;
a display processor configured to control a display mode of the image to be displayed on the display; and
an operation detector configured to detect presence or absence of touch of a first finger on at least a partial region of a display region of the display,
wherein the display processor is configured to cause the display to display, in a first predetermined display size, a display image of a first slider and a first thumb, the first slider indicating a settable range of an in-vehicle device, and the first thumb indicating a set value within the settable range, wherein when the operation detector continuously detects, for a first predetermined time, touch of the first finger on a first region where the first slider or the first thumb is displayed, the display processor is configured to cause the display to display a first enlarged display image of the first slider and the first thumb, wherein when the operation detector no longer detects touch of the first finger after detecting, for the first predetermined time, touch of the first finger on the first region where the slider is displayed, the display processor is configured to cause the display to stop displaying the first enlarged display image of the slider and the thumb after a lapse of a second predetermined time that is longer than the first predetermined time, and display, in the first predetermined display size, the display image of the first slider and the first thumb, wherein the in-vehicle device comprises a first air conditioner and a second air conditioner, wherein the display processor is configured to cause the display to display, in a second predetermined display size, a display image of a second thumb and a second slider, the first thumb being used to perform temperature setting on the first air conditioner, the first slider indicating a temperature settable range of the first air conditioner, the second thumb being used to perform temperature setting on the second air conditioner, and the second slider indicating a temperature settable range of the second air conditioner, wherein when the operation detector continuously detects, for the first predetermined time, touch of a second finger on a second region where the second thumb or the second slider is displayed while the first enlarged display image is displayed on the display, the display processor is configured to cause the display to display (i) the first enlarged display and (ii) a second enlarged display image of the second thumb and the second slider, wherein, while the first enlarged display image and the second enlarged display image are displayed on the display, when the operation detector no longer detects the touch of the first finger on the first region and the touch of the second finger on the second region for the second predetermined time, the display processor is configured to cause the display to stop displaying the first enlarged display image and the second enlarged display image substantially simultaneously, and wherein, while the first enlarged display image and the second enlarged display image are displayed on the display, when the operation detector detects the touch of the first finger on the first region or the touch of the second finger on the second region, the display processor is configured to continue causing the display to display the first enlarged display image and the second enlarged display image.

2. The vehicle display apparatus according to claim 1, wherein the first air conditioner comprises a driver's seat air conditioner, and the second air conditioner comprises a passenger seat air conditioner.

3. The vehicle display apparatus according to claim 1, wherein, when the display processor causes the display to display the first enlarged display image and the second enlarged display image, the display processor is configured to cause the display to display the first and second enlarged display images without overlapping each other.

4. The vehicle display apparatus according to claim 1,
wherein the vehicle display apparatus is arranged in a vehicle that has control modes including an advanced driver-assistance mode, and
wherein the display processor is configured to cause the display to display the first enlarged display image upon determining that the vehicle is in the advanced driver-assistance mode.

* * * * *